Sept. 2, 1930. H. A. LARNER 1,774,895
SKIP CONVEYER
Filed May 21, 1927 2 Sheets-Sheet 1
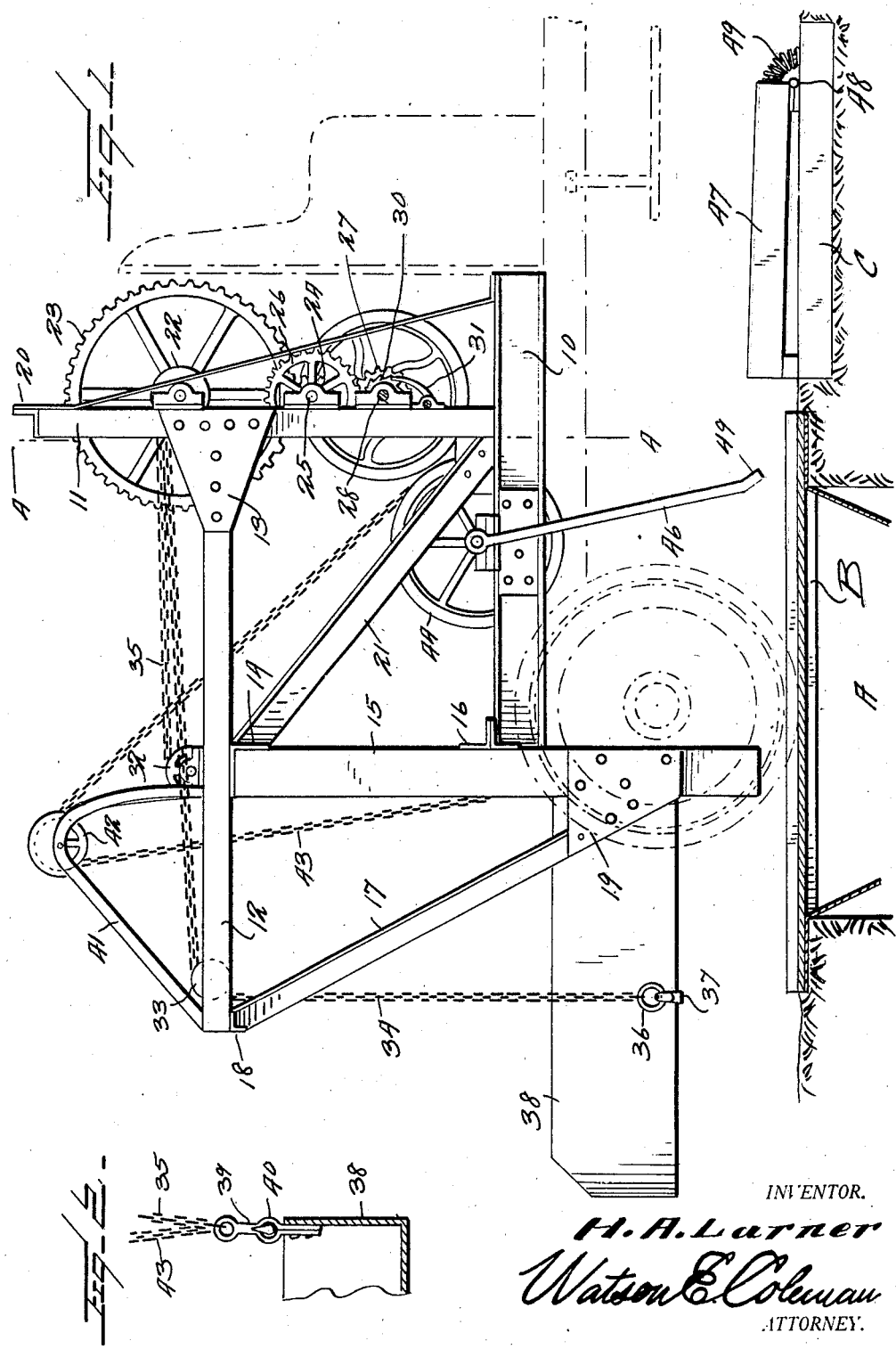
INVENTOR.
H. A. Larner
Watson E. Coleman
ATTORNEY.

Sept. 2, 1930. H. A. LARNER 1,774,895
SKIP CONVEYER
Filed May 21, 1927 2 Sheets-Sheet 2
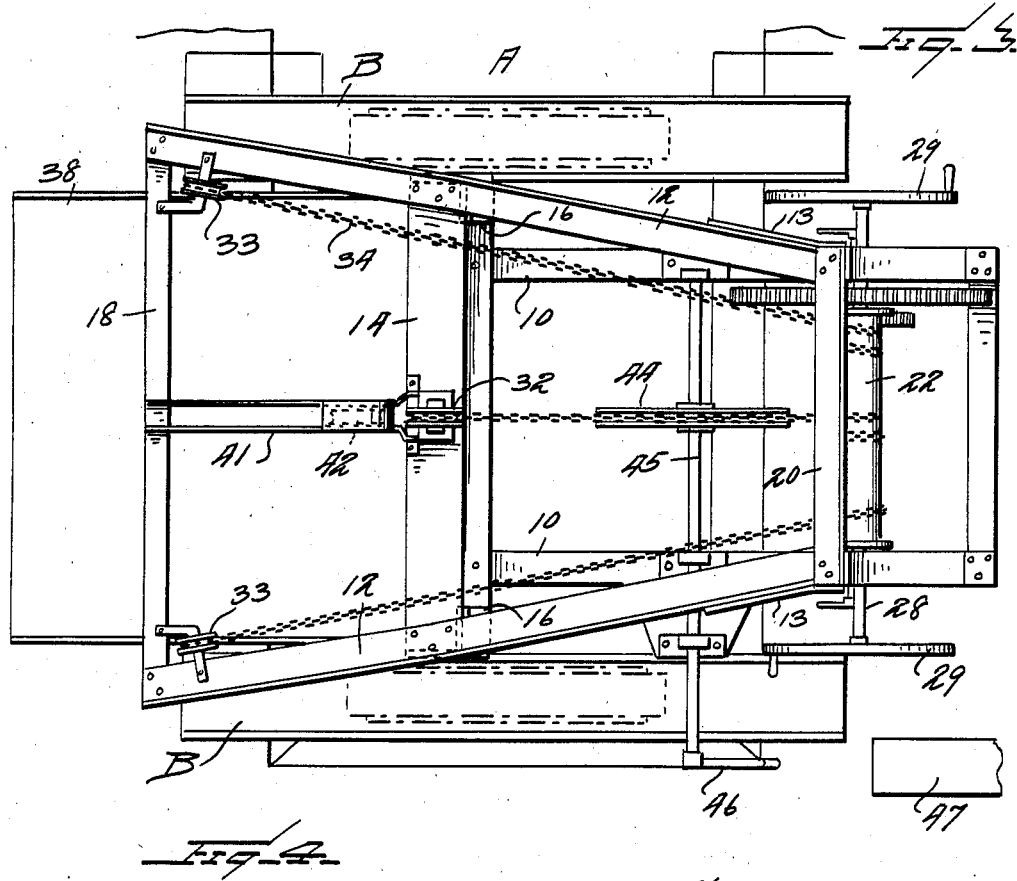
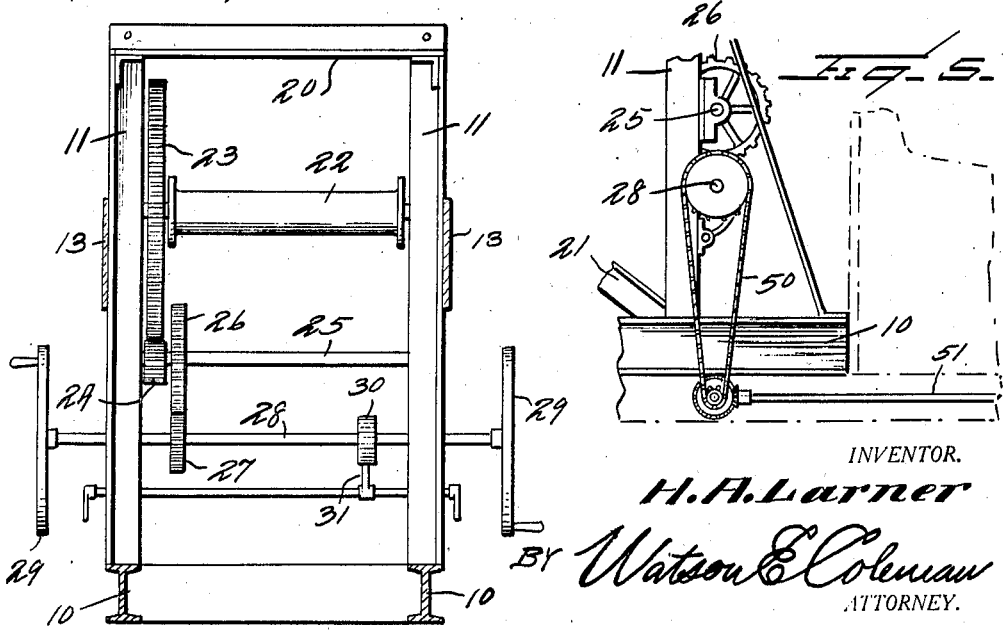
INVENTOR.
H. A. Larner
BY Watson E. Coleman
ATTORNEY.

Patented Sept. 2, 1930

1,774,895

UNITED STATES PATENT OFFICE

HERBERT A. LARNER, OF STAUNTON, VIRGINIA

SKIP CONVEYER

Application filed May 21, 1927. Serial No. 193,273.

This invention relates to transporting devices and particularly to conveyers or trucks for moving materials such as stone, coal, earth and the like, this invention being an improvement upon the construction illustrated, described and claimed in my Patent #1,547,592, granted July 28, 1925. In this patent I illustrated a skip conveyer wherein the frame of the conveyer is part of the truck and I further illustrated a skip conveyer in which the skip is tripped by hand.

One of the objects of the present invention is to improve upon the skip conveyer illustrated in this patent by providing a frame which is adapted to be mounted upon any automobile truck as a unit or as a unit removed therefrom.

A further object is to so construct the frame that it is particularly strong and yet relatively light.

A still further object is to provide means for automatically tripping the skip to dump the latter, and more particularly to provide a tripping member mounted upon the truck or frame supported thereby, which tripping member as the car reaches the dumping place is automatically shifted so as to take up on the tripping cable or chain to thus tip and discharge the contents of the skip.

Another object is to provide a mechanism of this character which will permit the car to pass over a cut in which the receiving car is disposed and will cause the discharge or tipping of the skip at the proper time just as the skip is over this cut to thereby discharge the contents of the skip into the receiving car in the cut.

Other objects will appear in the course of the following description.

My invention is illustrated in the accompanying drawings, wherein:—

Figure 1 is a side elevation of my skip conveyer applied to a truck, the truck being shown in dotted lines;

Figure 2 is a fragmentary section through the rear end of the skip, showing the means for connecting the chains thereto;

Figure 3 is a top plan view of the structure shown in Figure 1;

Figure 4 is a section on the line 4—4 of Figure 1;

Figure 5 is a fragmentary elevation showing the power operated means for raising the skip.

It is common in quarries to provide small cars operating on tracks and by which the rocks and broken stone are conveyed to stone crushers. There are many of these small tracks and many cars and it is necessary to shift the tracks from one pile of stone to another, move the cars on the tracks to the stone pile, load the cars, and then run the cars back to the crushers. This requires the services of from ten to twelve men ordinarily. My skip conveyer is designed to pick up skips or trays upon which the broken stone is loaded, carry or convey this skip to the stone crusher, discharge the contents, return to the quarry, and then drop the unloaded skip, pick up a loaded skip and repeat the operation, thus doing away with the necessity of building tracks and of shifting these tracks from one place to another as the quarrying operation is continued and doing away with the work of many men.

As illustrated in the accompanying drawings, the frame of my skip conveyer includes two longitudinally extending channel or angle beams, designated 10. From these beams extend the uprights 11 which are preferably of angle iron, though I do not wish to be limited thereto, and from the uprights 11 extend the horizontal beams 12 which are connected to the uprights 11 by the gusset plates 13. The irons 12 extend rearward and outward, as shown in Figure 3. The irons 12 are connected by means of a transverse iron 14 which is preferably an angle iron, and this transverse angle iron 14 rests upon vertical angle irons 15 which extend downward and are connected by a transverse angle iron 16 to the ends of the beams 10.

The ends of the horizontal irons 12 are braced by means of upwardly and outwardly extending angle iron braces 17 which are connected at their upper ends to the transverse beam 18 and at their lower ends by gusset plates 19 to the vertical members 15. The upper ends of the uprights 11 are connected by a transverse angle iron 20. Upwardly and rearwardly extending braces 21 extend from the junction of the irons 10 and 11 to the transverse angle iron 14. It will thus be seen that a rigid and solid frame is provided which is adapted to be mounted upon the chassis of an automobile truck, the vertical beams 15 extending downward just inward of the wheels of the truck and rearward of the rear axle.

Mounted upon the uprights 11 in suitable bearings is a transverse winding drum 22 whose shaft is provided with a gear wheel 23. This gear wheel meshes with a pinion 24 carried upon a shaft 25. This shaft 25 carries upon it a gear wheel 26 which meshes with a gear wheel 27 carried upon the countershaft 28. This countershaft is illustrated as provided with a crank handle 29 whereby the shaft may be rotated, but it is to be understood that this countershaft might be driven from the motor of the truck by means which will be later referred to.

The shaft 28 carries upon it a ratchet wheel 30 and a pawl 31 is adapted to engage this ratchet wheel to prevent reverse motion thereof. Mounted upon the cross beam 14 is a pulley 32 and mounted at the junction of the beams 12 with the cross beam 18 are pulleys 33. Chains, cables or other flexible connections 34 pass from the winding drum over these pulleys 33 and depend therefrom. A chain, cable or other flexible connection 35 passes from the winding drum over the pulley 32 and then extends downward. The chains 34 are each formed with a ring 36 at the lower end adapted to engage a stud 37 formed on the side walls of the skip 38 adjacent the bottom thereof. The chain 35 also carries at its lower end a hook 39 adapted to engage an eye 40 riveted or otherwise attached to the rear wall of the skip. It will be noted that the studs 37 are disposed adjacent the bottom of the skip and the eye 40 is disposed at the top of the rear wall of the skip. The studs or hooks 37 are disposed at such a distance from the rear wall that when the skip is loaded the load will tend to depress the rear end of the skip against the action of the supporting chain 35.

In order to dump the skip it is necessary to lift up on the end of the skip so as to tilt the skip to a discharging angle. To this end and to provide means for automatically dumping the skip, I mount upon the cross beams 14 and 18 the upwardly extending arch-shaped irons 41 and mount upon these irons the pulley 42. Attached to the lower end of the chain 35 adjacent its point of connection to the skip is a chain 43 which passes upward over the pulley 42 and then downward and forward over a winding wheel 44, which wheel is grooved and mounted upon the transverse shaft 45. This shaft 45 is mounted in suitable bearings upon the beams 10 and at its end is provided with a relatively long, normally depending crank arm 46 which extends downward in a plane exterior to the plane of the rear wheels. When the fore end of the skip is raised, the crank arm by its weight will shift to approximately the position shown in Figure 1 and will retain this position while the truck is moving from the loading place to the discharge place.

The broken stone received from the quarry is discharged into cars and the broken stone is then raised up an inclined track to the stone crusher. The car which runs upon this inclined track moves downward into a pit A. Two I-beams B extend across this pit so as to form trackways over which the wheels of the truck may move. Disposed slightly beyond the trackway and hinged upon a supporting sill C is a tripping member 47. This is hinged at 48 and normally extends downward approximately parallel to the ground. After the forward wheels of the truck have passed over the I-beam supports B, the lower end of the crank arm 46, which lower end is slightly turned, as at 49, will engage the extremity of this tripping member 47 and as the truck moves forward the shaft 45 will be rotated in a clockwise direction. At the same time that the crank arm 46 is swinging rearward and upward, the tripping member 47 will swing upward until eventually the crank arm 46 will be in an approximately horizontal position and extending rearward and the tripping member will be raised to an upwardly and rearwardly inclined position. The movement of the crank arm will cause the winding up of the tripping chain 43, which will tilt the fore end of the skip member from a horizontal position to a downwardly and rearwardly inclined discharging position, which will automatically cause the discharge of the stone into the pit in which is the receiving car.

As soon as the contents of the skip have been discharged, the weight of the crank handle 46, which is relatively long, as before stated, and which has shifted the extremity of the tripping member 47, will cause the wheel 44 to rotate in a reverse direction, lowering the rear end of the skip until the skip is in its horizontal or receiving position. The car then moves back to the quarry and when at the quarry the pawl 31 is released and the drum 22 is reversely rotated to lower all three of the chains supporting the skip so that the skip is lowered upon the ground, the chain is then detached from the unloaded skip, the car is driven off to a loaded skip, the chains are engaged therewith, and the crank 29 then turned to rotate the drum to lift the skip to any desired height. It will be understood that the skip may be raised to any height desired above the ground and the mechanism will work precisely as heretofore described. In order to return the tripping member 47 to its initial position after the crank handle 46 has escaped therefrom, I preferably provide a small coiled spring 49 which is compressed as the tripping member 47 is turned to a vertical or nearly vertical position and which acts to throw back the tripping member just as soon as the tripping member is released by the arm 46.

This mechanism permits the discharge of the skip without the driver getting down from the machine or without any manual operation by the driver as the discharging action is entirely automatic. While I have illustrated the raising of the loaded skip as being accomplished by means of a crank, a train of gears transmitting power from the crank to the winding drum, I do not wish to be limited to this as it is obvious that the drum might be driven from the engine in many ways. Thus, for instance, a sprocket chain 50 might operatively engage the shaft 28 and receive power from a longitudinal shaft 51 driven in any suitable manner by the engine. This showing is purely illustrative of the fact that the drum might be rotated by the motor of the truck itself, and obviously many different arrangements for this purpose might be used. The use of the tripping member 47 is necessary in order that the crank arm 46 should be rotated a sufficient distance to raise the rear end of the skip to a degree sufficient to give the skip the proper critical angle to cause the discharge of the contents thereof.

While I have illustrated certain details of construction and arrangement of parts, I do not wish to be limited thereto as it is obvious that many changes might be made in these details without departing from the spirit of the invention as defined in the appended claims. Any number of skips may be used with this machine. A skip can be hooked up and unhooked in a few seconds and the skip may be elevated to any desired height so as to clear all obstacles or secure the proper inclination of the skip in order to discharge it. With this machine, when it is used in a quarry the material may be loaded immediately after a blast and rapidly conveyed to the crusher without the necessity of first laying track. When this machine and the skips are used, the men operating the quarry never have to leave their work in order to move cars, as they have to do where tracks and small cars are used.

I claim:—

1. The combination with a truck, of a skip, supporting members on the truck, flexible connections supported on the members and adapted to detachably engage the skip, means on the truck for placing strain upon the flexible connections to hoist the truck, and means for automatically raising one end of the skip to discharge the contents therefrom when the truck reaches the discharge point including a skip tilting member mounted on the truck and a trip member disposed at the discharge point with which the tilting member engages when the truck arrives at the discharge point.

2. The combination with a truck, of a skip, a supporting frame on the truck, flexible connections supported on said frame and detachably engaging the skip, means on the truck for placing strain upon the flexible connections to hoist the skip, means for automatically raising one end of the skip to discharge the contents thereof including a rotatable skip tilting member having an arm, and a tripping member disposed at the discharge point with which said arm is adapted to engage as the truck arrives at the discharge point and moves forward.

3. The combination with a truck, of a skip, a supporting frame on the truck, flexible connections supported on said frame and detachably engaging the skip, means on the truck for placing strain upon the flexible connections to hoist the skip, means for automatically raising one end of the skip to discharge the contents thereof including a rotatable skip tilting member having an arm, and a tripping member disposed at the discharge point with which said arm is adapted to engage as the truck arrives at the discharge point and moves forward, said tripping member being hingedly mounted at its forward end for movement in a vertical plane.

4. The combination with a truck, of a supporting frame mounted upon the truck and extending beyond the rear end thereof, a winding drum, flexible connections extending from the winding drum, pulleys over which the flexible connections pass and from which they depend, a skip with which the flexible connections have detachable engagement, means for operating the winding drum to raise or lower the flexible connections of the skip and means for automatically raising the forward end of the skip to discharge the contents thereof when the truck has reached the discharge point.

5. A skip conveyer including a truck, a skip supporting frame thereon, means on the frame for detachably engaging and raising or lowering the skip, and means for automatically tilting the skip to discharge its contents when the truck has reached a predetermined discharge point.

6. A skip conveyer including a truck, a skip supporting frame thereon, means on the frame for detachably engaging and raising or lowering the skip, means for automatically tilting the skip to discharge its contents when the truck has reached an unloading point including a skip tilting member mounted on the truck and having an arm rotatable and movable around a center in a vertical plane, and a trip member disposed at the discharge point, the trip member being hinged at one end whereby it may tip in a vertical plane, the free end of the trip member being adapted to be engaged by the extremity of the arm to cause the coincident lifting of the trip member and rearward and upward movement of the said arm.

7. A skip conveyer including a truck, a supporting frame projecting beyond the rear of the truck, pulleys mounted on the supporting frame, flexible supporting and lifting elements passing through said pulleys and depending therefrom, winding means for the flexible elements, each of said flexible elements having means at its free end whereby it may be detachably engaged with a skip, a flexible element operatively connected to one end of the skip, winding means therefor including a shaft having a crank arm, and means for tripping said crank arm to raise one end of the skip including a tripping member mounted for swinging movement in a vertical plane, the extremity of the crank arm being formed to engage the free extremity of the trip whereby as the truck moves forward the trip will be raised and the crank arm coincidently swung upward and rearward.

8. A skip conveyer including a truck, a skip supporting frame thereon and having elements projecting rearward beyond the rear of the truck, pulleys mounted upon the supporting frame, flexible supporting and lifting elements extending through said pulleys, a winding drum mounted upon the supporting frame and over which said flexible elements are wound, the free ends of the flexible elements having means whereby they may be detachably engaged with the sides and forward ends of a skip, a supporting pulley mounted upon the frame, a flexible element passing thereover and operatively connected to the forward end of the skip, winding means, therefor including a shaft having a radially extending arm, the extremity of the arm being angularly bent, and a trip for engaging said arm to thereby operate the winding shaft to raise the forward end of the skip comprising a member hingedly mounted at its forward end for movement in a vertical plane and disposed at a discharge point for the skip and with the free end of which the angular end of the arm is adapted to engage.

9. The combination of a support, transportable from place to place, a skip, means pivotally supporting the skip from the frame whereby it may dump on a horizontal axis, a rotating member mounted on a horizontal axis on the frame, a flexible connection between the skip to one side of the pivot thereof and said rotating member, and an arm connected to said rotating member and extending downward with a free end in position to engage a stationary part as said arm is moved bodily forward with the supporting frame whereby said rotating member will be turned and said flexible connection moved to tilt the skip.

10. The combination of a frame which comprises vertical posts, horizontal supports mounted thereon at the top of the vertical posts, and a pair of horizontal beams spaced below the horizontal supports and extending forwardly therefrom in positions corresponding with the opposite sides of the chassis of a motor truck, said horizontal supports extending forward above said two beams, a skip disposed in rear of said vertical posts, a winding drum mounted upon the vertical posts, flexible connections extending from the winding drum to said skip and pivotally engaged with the skip, a second winding drum having a flexible connection extending to the forward end of the skip, an arm operatively connected to said second winding drum and extending downward therefrom with its free end in position to engage a stationary member on the ground when said frame is mounted upon the chassis whereby to cause the movement of the arm and of the winding drum when the arm is engaged with the stationary member and the winding up of said last named flexible connection to tilt the skip.

In testimony whereof I hereunto affix my signature.

HERBERT A. LARNER.